(12) United States Patent
Lai et al.

(10) Patent No.: US 9,119,268 B2
(45) Date of Patent: Aug. 25, 2015

(54) DRIVER WITH ISOLATION AND SURGE SIGNAL PROTECTION

(71) Applicant: KONINKLIJKE PHILIPS N.V., Eindhoven (NL)

(72) Inventors: Bing Lai, Shanghai (CN); Bernd Clauberg, Schaumburg, IL (US); Yunfeng Li, Shanghai (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 13/934,761

(22) Filed: Jul. 3, 2013

(65) Prior Publication Data

US 2014/0368124 A1    Dec. 18, 2014

(51) Int. Cl.
 *H05B 41/36* (2006.01)
 *H05B 33/08* (2006.01)
(52) U.S. Cl.
 CPC .................................... *H05B 33/089* (2013.01)
(58) Field of Classification Search
 USPC ......... 315/85, 206, 291, 239; 363/21.04, 188, 363/56.01
 See application file for complete search history.

(56) References Cited

U.S. PATENT DOCUMENTS

| | | | |
|---|---|---|---|
| 4,719,403 A * | 1/1988 | Beischer | 323/234 |
| 7,746,005 B2 * | 6/2010 | Weinert et al. | 315/291 |
| 2003/0080694 A1 * | 5/2003 | Collins | 315/276 |
| 2005/0002213 A1 * | 1/2005 | Komori et al. | 363/56.01 |
| 2007/0145960 A1 * | 6/2007 | Hatano et al. | 323/282 |
| 2008/0018261 A1 * | 1/2008 | Kastner | 315/192 |
| 2012/0092115 A1 * | 4/2012 | Srinivasrao et al. | 336/170 |
| 2012/0140525 A1 * | 6/2012 | Cuadra et al. | 363/21.04 |
| 2012/0256551 A1 | 10/2012 | Kim et al. | |
| 2013/0049589 A1 * | 2/2013 | Simi | 315/85 |
| 2013/0083580 A1 * | 4/2013 | Komiya et al. | 363/131 |
| 2013/0128401 A1 * | 5/2013 | Tsaur et al. | 361/56 |
| 2014/0334198 A1 * | 11/2014 | Yang et al. | 363/21.12 |

FOREIGN PATENT DOCUMENTS

| | | |
|---|---|---|
| EP | 0529949 A2 | 3/1993 |
| JP | 5161258 A | 6/1993 |
| JP | 9326709 A | 12/1997 |
| JP | 2011125177 A | 6/2011 |

* cited by examiner

*Primary Examiner* — Thuy Vinh Tran
*Assistant Examiner* — Syed M Kaiser
(74) *Attorney, Agent, or Firm* — Yuliya Mathis

(57) ABSTRACT

Drivers for driving light circuits with light emitting diodes include an isolation circuit with a primary part and a secondary part and a guiding circuit for guiding common mode surge signals to a reference potential. The isolation circuit may be configured to guide a first part of the common mode surge signal away from the light circuit, and the guiding circuit may be configured to guide a second part of the common mode surge signal away from the light circuit, the second part being smaller than the first part. The guiding circuit may include one or more capacitors for connecting one or more terminals of the secondary part to the reference potential, where the value(s) of the one or more capacitors is/are larger than values of a parasitic capacitance of the isolation circuit.

3 Claims, 3 Drawing Sheets

DRIVER WITH ISOLATION AND SURGE SIGNAL PROTECTION

FIELD OF THE INVENTION

The invention relates to a driver for driving a light circuit comprising at least one light emitting diode. The invention further relates to a device.

Examples of such a device are lamps and parts thereof.

BACKGROUND OF THE INVENTION

JP 05 161258 A discloses a surge voltage absorbing circuit located between a source circuit and a rectifier circuit.

SUMMARY OF THE INVENTION

It is an object of the invention to provide an improved driver. It is a further object of the invention to provide an improved device.

According to a first aspect, a driver is provided for driving a light circuit comprising at least one light emitting diode, the driver comprising
- an isolation circuit comprising a primary part for receiving a primary signal from a source circuit and a secondary part for supplying a secondary signal to the light circuit, and
- a guiding circuit for guiding a common mode surge signal to a reference potential.

By having added an isolation circuit, a primary part for receiving a primary signal from a source circuit and a secondary part for supplying a secondary signal to the light circuit have been created that provide isolation, such as for example galvanic isolation. By having added a guiding circuit for guiding a common mode surge signal such as a common mode surge voltage or a common mode surge current to a reference potential, a common mode surge signal is guided to the reference potential. This way, the light circuit connected to the secondary part is protected against common mode surge signals. Such a combination of a driver and a light circuit can be used well in outdoor applications. These are great advantages.

A light circuit comprises one or more light emitting diodes of whatever kind and in whatever combination.

An embodiment of the driver is defined by the isolation circuit being designed to guide a first part of the common mode surge signal away from the light circuit and the guiding circuit being designed to guide a second part of the common mode surge signal away from the light circuit, the second part being smaller than the first part. One way to realize this is by coupling the guiding circuit to the secondary part of the isolation circuit. This way, for the common mode surge signal, a serial connection has been created comprising the isolation circuit and the guiding circuit.

An embodiment of the driver is defined by the guiding circuit comprising
- a capacitor for connecting a first terminal of the secondary part to the reference potential. This way a common mode surge signal is guided to the reference potential at the secondary part. This capacitor forms, together with a parasitic capacitance of the light circuit, a parallel connection.

An embodiment of the driver is defined by a value of the capacitor being larger than a value of a parasitic capacitance of the isolation circuit. This way, a larger part of the common mode surge signal is guided away from the light circuit by the isolation circuit and a smaller part of the common mode surge signal is guided away from the light circuit by the capacitor. A larger capacitance value results in a smaller impedance value. Preferably, the value of the capacitor will be at least ten times larger than the value of the parasitic capacitance of the isolation circuit. Owing to the fact that, in view of the common mode surge signal, the capacitor and the parasitic capacitance of the light circuit form a parallel connection, and owing to the fact that this parallel connection and the parasitic capacitance of the isolation circuit form a serial connection, for the defined values most stress resulting from the common mode surge signal is guided away from the light circuit.

An embodiment of the driver is defined by the guiding circuit comprising
- a further capacitor for connecting a second terminal of the secondary part to the reference potential.

An embodiment of the driver is defined by a value of the further capacitor being larger than a value of a parasitic capacitance of the isolation circuit.

An embodiment of the driver is defined by the driver comprising
- a capacitor for connecting a first terminal of the primary part to the reference potential. This way a common mode surge signal is guided to the reference potential also at the primary part.

An embodiment of the driver is defined by the driver not comprising any capacitor that interconnects the primary part and the secondary part when having a value equal to or larger than a value of a capacitor of the guiding circuit and when having a value equal to or larger than a value of a parasitic capacitance of the isolation circuit. In a prior art situation, to guide a common mode surge signal to a reference potential, the primary and secondary parts were interconnected via a first prior art capacitor and one of both terminals of the secondary part was connected to the reference potential via a second prior art capacitor. According to this prior art situation, in a standby state a relatively large glow current may flow from the primary part to the secondary part via the first prior art capacitor. Such a relatively large glow current is not desired. According to an improved situation, this relatively large glow current is avoided, by having avoided the first prior art capacitor. Further according to this prior art situation, a relatively large voltage-to-ground-value may become present at the light circuit. Such a relatively large voltage-to-ground-value is not desired. According to an improved situation, this relatively large voltage-to-ground-value is avoided, by having avoided the first prior art capacitor.

The fact that the driver does not comprise any capacitor that connects the primary part and the secondary part to each other does of course not exclude a presence of a parasitic capacitance as usually present between the parts.

An embodiment of the driver is defined by the isolation circuit comprising an isolation transformer, the primary part comprising a primary winding of the isolation transformer, and the secondary part comprising a secondary winding of the isolation transformer. Isolation transformers provide galvanic isolation.

An embodiment of the driver is defined by the driver further comprising
- a rectifier circuit for rectifying the primary signal with inputs to be coupled to outputs of the source circuit and with outputs coupled to inputs of the primary part.

The inputs of the primary part may be identical to the terminals of the primary part or not. Outputs of the secondary part may be identical to the terminals of the secondary part or not.

An embodiment of the driver is defined by the driver further comprising
a metal housing to be connected to the reference potential, the isolation circuit being fully surrounded by the metal housing. Such a metal housing is also known as a Faraday cage or a Faraday shield.

An embodiment of the driver is defined by the reference potential being protective earth.

According to a second aspect, a device is provided comprising the driver and further comprising the light circuit connected to the secondary part.

An embodiment of the device is defined by a value of a capacitor of the guiding circuit being larger than a value of a parasitic capacitance of the light circuit. Again, owing to the fact that, in view of the common mode surge signal, the capacitor and the parasitic capacitance of the light circuit form a parallel connection, and owing to the fact that this parallel connection and the parasitic capacitance of the isolation circuit form a serial connection, for the defined values most stress resulting from the common mode surge signal is guided away from the light circuit.

An insight is that a common mode surge signal is to be guided away from a light circuit. A basic idea is that a guiding circuit is to be used for guiding a common mode surge signal to the reference potential.

A problem to provide an improved driver has been solved. A further advantage is that a relatively large glow current to the light circuit is avoided and that a relatively large voltage-to-ground-value at the light circuit is avoided.

These and other aspects of the invention will be apparent from and elucidated with reference to the embodiments described hereinafter.

DETAILED DESCRIPTION OF EMBODIMENTS

Figure 1:
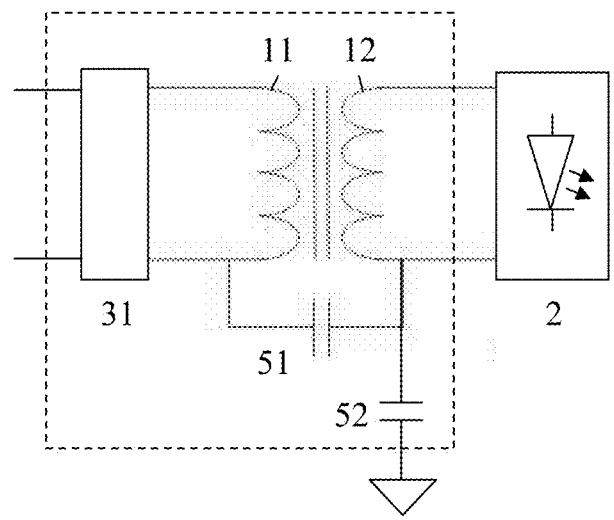
FIG. 1 shows an embodiment of a prior art driver.

In the FIG. 1, an embodiment of a prior art driver is shown. The prior art driver for driving a light circuit 2 with at least one light emitting diode comprises an isolation circuit, here in the form of an isolation transformer 11, 12 that provides galvanic isolation, but other kinds of isolation circuits are not to be excluded. The isolation circuit comprises a primary part here in the form of a primary winding 11 for receiving a primary signal from a source circuit 4 (see FIG. 3) and a secondary part here in the form of a secondary winding 12 for supplying a secondary signal to the light circuit 2. The prior art driver further comprises a first prior art capacitor 51 that connects the primary and secondary parts with each other and a second prior art capacitor 52 that connects a secondary side of the first prior art capacitor 51 to protective earth. Further, a rectifier circuit 31 is present for rectifying the primary signal. Inputs of the rectifier circuit 31 are to be coupled to outputs of the source circuit and outputs of the rectifier circuit 31 are coupled to inputs of the primary part.

Figure 2:
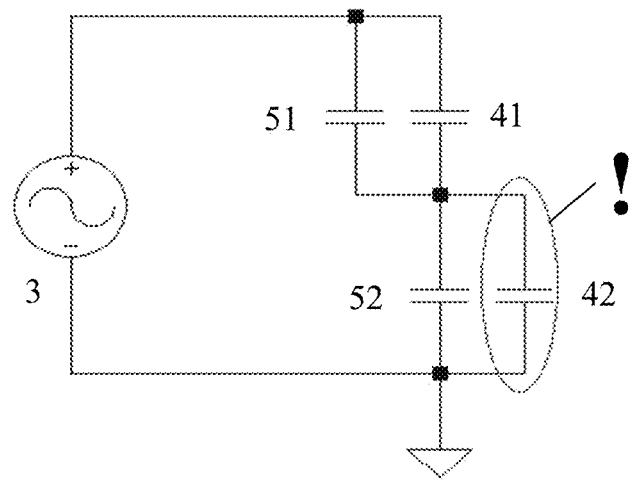
FIG. 2 shows a behavior of the prior art driver.

In the FIG. 2, a behavior of the prior art driver is shown. A common mode surge signal 3 such as a common mode surge voltage or a common mode surge current experiences a serial connection of a first parallel connection and a second parallel connection. The first parallel connection comprises the first prior art capacitor 51 and a parasitic capacitance 41 of the isolation transformer 11, 12. The second parallel connection comprises the second prior art capacitor 52 and a parasitic capacitance 42 of the light circuit 2. Owing to the fact that the first and second prior art capacitors 51, 52 will have values that do not differ too much from each other, and owing to the fact that the parasitic capacitances 41, 42 will have values smaller than the values of the first and second prior art capacitors 51, 52, the impedances of the parasitic capacitances 41, 42 will have values larger than the values of the impedances of the first and second prior art capacitors 51, 52, and the common mode surge signal 3 will put relatively much stress on the light circuit 2, as indicated by the relatively large exclamation mark.

According to this prior art situation, in a standby state a relatively large glow current may flow from the primary part to the secondary part via the first prior art capacitor 51. Such a relatively large glow current is not desired. Via the first prior art capacitor 51, a relatively large voltage-to-ground-value may become present at the light circuit 2. Such a relatively large voltage-to-ground-value is not desired too.

Figure 3:
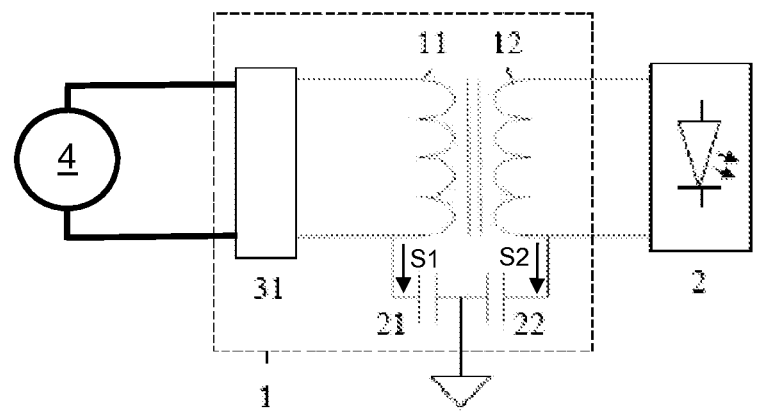
FIG. 3 shows an embodiment of an improved driver.

In FIG. 3, an embodiment of an improved driver 1 is shown. The improved driver 1 differs from the prior art driver shown in the FIG. 1 in that the improved driver 1 comprises a guiding circuit for guiding a common mode surge signal 3 to a reference potential. Preferably, the isolation transformer 11, 12 is designed to guide a first part S1 of the common mode surge signal 3 away from the light circuit 2 and the guiding circuit is designed to guide a second part S2 of the common mode surge signal 3 away from the light circuit 2, the second part being smaller than the first part.

The guiding circuit comprises for example a capacitor 22 for connecting a first terminal of the secondary winding 12 to the reference potential, a value of the capacitor 22 being larger than a value of a parasitic capacitance 41 of the isolation transformer 11, 12. In that case, a larger part of the common mode surge signal 3 is guided away from the light circuit 2 by the isolation transformer 11, 12 and a smaller part of the common mode surge signal 3 is guided away from the light circuit 2 by the capacitor 22. The improved driver 1 may further comprise a capacitor 21 for connecting a first terminal of the primary winding 11 to the reference potential. This first terminal may be one of both terminals of the primary winding 11. Clearly, the driver 1 does not comprise any capacitor that connects the primary winding 11 and the secondary winding 12 to each other.

Figure 4:
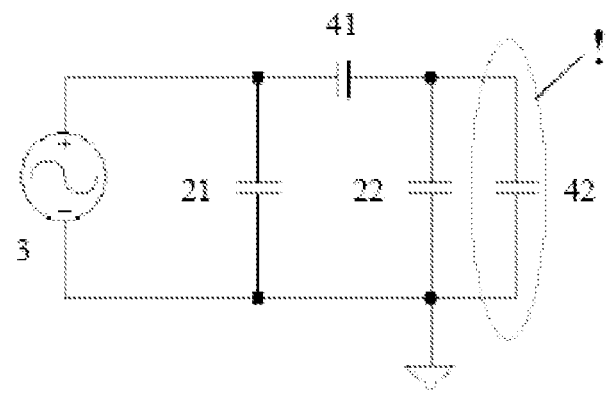
FIG. 4 shows a behavior of the improved driver.

In the FIG. 4, a behavior of the improved driver 1 is shown. A common mode surge signal 3 experiences a first parallel connection of the capacitor 21 and a serial connection. The serial connection comprises a parasitic capacitance 41 of the isolation transformer 11, 12 and a second parallel connection. The second parallel connection comprises the capacitor 22 and a parasitic capacitance 42 of the light circuit 2. Owing to the fact that the capacitors 21, 22 will have values that do not differ too much from each other, and owing to the fact that the parasitic capacitances 41, 42 will have values smaller than the values of the capacitors 21, 22, the impedances of the parasitic capacitances 41, 42 will have values larger than the values of the impedances of the capacitors 21, 22, and the common mode surge signal 3 will put relatively little stress on the light circuit 2, as indicated by the relatively small exclamation mark.

So, a value of the capacitor 22 may be larger than a value of a parasitic capacitance 41 of the isolation transformer 11, 12 and than a value of a parasitic capacitance 42 of the light circuit 2.

According to the improved situation, the relatively large glow current is avoided, by having avoided the first prior art capacitor 51. And when having avoided the first prior art capacitor 51, the relatively large voltage-to-ground-value at the light circuit 2 is avoided as well.

When comparing the FIGS. 2 and 4 it becomes clear that the stress resulting from a common mode surge signal 3 at the primary part of the isolation transformer 11, 12 is shifted away from (the parasitic capacitance 42 of) the light circuit 2 to (the parasitic capacitance 41 of) the isolation transformer 11, 12. Isolation transformers 11, 12 and other kinds of isolation circuits as for example shown in the FIG. 6 can usually survive much more stress resulting from common mode surge signals 3 than light circuits 2 comprising light emitting diodes.

A capacitor for interconnecting the primary winding 11 and the secondary winding 12 to each other may only be present in case it has a value smaller than a value of the capacitors 22, 23 (preferably 20% or smaller, further preferably 10% or smaller) and in case it has a value smaller than a value of the parasitic capacitance 41 of the isolation circuit (preferably 50% or smaller, further preferably 25% or smaller).

Figure 5:
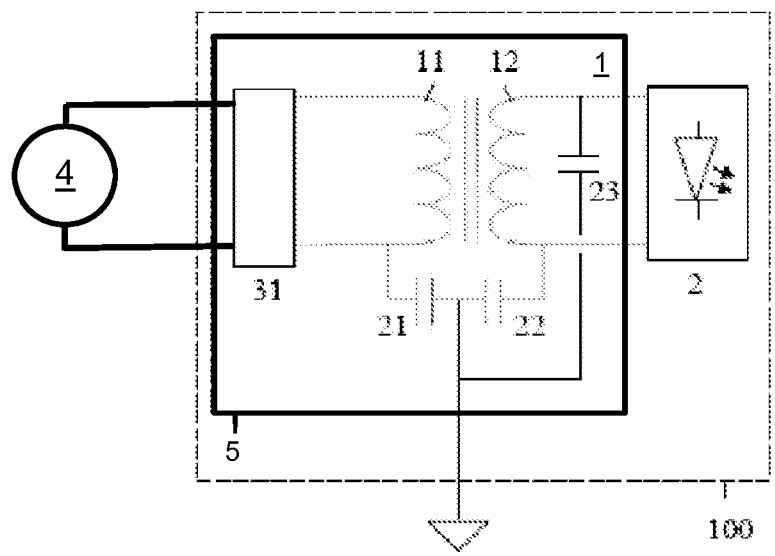
FIG. 5 shows a device.

In the FIG. 5, a device 100 is shown comprising the improved driver 1 and the light circuit 2. Here, the improved driver 1 further comprises a capacitor 23 for connecting a second terminal of the secondary winding 12 to the reference potential. A value of the capacitor 23 may be larger than values of a parasitic capacitance 41 of the isolation transformer 11, 12 and a parasitic capacitance 42 of the light circuit 2.

Further, the improved driver 1 may further comprise a metal housing 5 to be connected to the reference potential, the isolation circuit being fully surrounded by the metal housing. Such an improved driver 1 is extremely suitable for outdoor applications and can survive lightning surges. The reference potential may for example be protective earth or a heat sink etc.

Figure 6:
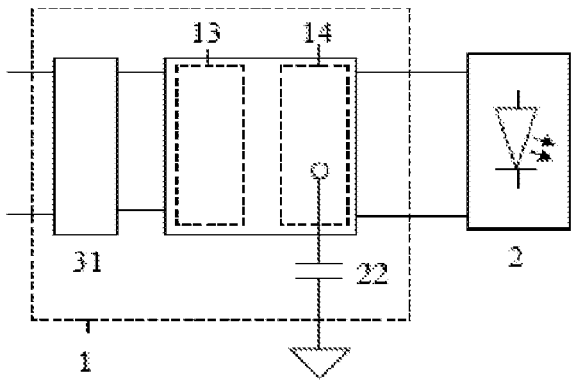
FIG. 6 shows another embodiment of an improved driver.

In the FIG. 6, another embodiment of an improved driver 1 is shown, that differs from the embodiment shown in the FIG. 3 in that this driver 1 comprises an isolation circuit with a primary part 13 and with a secondary part 14. This isolation circuit for example comprises inductively coupled inductors different from the windings of a transformer.

First and second elements may be coupled directly or may be coupled indirectly via a third element. The rectifier circuit 31 may be located inside or outside the driver 1.

Summarizing, drivers 1 for driving light circuits 2 with light emitting diodes comprise isolation circuits 11-14 with primary parts 11,13 and secondary parts 12, 14 and guiding circuits 22, 23 for guiding common mode surge voltages to reference potentials. The isolation circuits 11-14 may be designed to guide first parts of the common mode surge signals 3 away from the light circuits 2 and the guiding circuits 22, 23 may be designed to guide second parts of the common mode surge signals 3 away from the light circuits 2, the second parts being smaller than the first parts. The guiding circuit 22, 23 may comprise capacitors 22 for connecting first terminals of the secondary parts 12, 14 to the reference potentials, values of the capacitors 22 being larger than values of parasitic capacitances 41 of the isolation circuits 11-14. The driver 1 does not comprise any capacitor that interconnects the primary and secondary parts 11-14.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A driver for driving a light circuit comprising at least one light emitting diode, the driver comprising:
    an isolation transformer comprising:
        a primary winding connected to receive a primary signal, and
        a secondary winding connected to supply a secondary signal to the light circuit;
    a first capacitance element connected between a first terminal of the primary winding and a reference potential; and
    a second capacitance element connected between a first terminal of the secondary winding and the reference potential,
    wherein the first capacitance element has a capacitance which is greater than a parasitic capacitance of the isolation transformer, and
    wherein the second capacitance element has a capacitance which is greater than a parasitic capacitance of the light circuit.

2. The driver of claim 1, further comprising a third capacitance element connected between a second terminal of the secondary winding and the reference potential.

3. The driver of claim 1, wherein the third capacitance element has a capacitance which is greater than a parasitic capacitance of the isolation transformer, and greater than a parasitic capacitance of the light circuit.

* * * * *